United States Patent
Akai et al.

(10) Patent No.: US 9,566,770 B2
(45) Date of Patent: Feb. 14, 2017

(54) POLYOLEFIN COMPOSITE FILM

(75) Inventors: Ikuo Akai, Ichihara (JP); Tomohiro Abe, Ichihara (JP); Takayuki Kuroki, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 726 days.

(21) Appl. No.: 13/881,073

(22) PCT Filed: Nov. 10, 2011

(86) PCT No.: PCT/JP2011/075984
§ 371 (c)(1),
(2), (4) Date: Apr. 23, 2013

(87) PCT Pub. No.: WO2012/063914
PCT Pub. Date: May 18, 2012

(65) Prior Publication Data
US 2013/0202864 A1    Aug. 8, 2013

(30) Foreign Application Priority Data

Nov. 10, 2010 (JP) ................................ 2010-251895

(51) Int. Cl.
B32B 27/32 (2006.01)
B32B 27/08 (2006.01)

(52) U.S. Cl.
CPC ............... B32B 27/32 (2013.01); B32B 27/08 (2013.01); B32B 2250/03 (2013.01); B32B 2250/24 (2013.01); B32B 2250/242 (2013.01); B32B 2307/31 (2013.01); B32B 2439/70 (2013.01); C08L 2203/162 (2013.01); Y10T 428/2495 (2015.01); Y10T 428/31913 (2015.04)

(58) Field of Classification Search
CPC ............... Y10T 428/2495; C08L 23/10–23/16; C08L 23/20; B32B 27/08; B32B 27/32; B32B 2250/03; B32B 2250/242
See application file for complete search history.

(56) References Cited

U.S. PATENT DOCUMENTS

| | | | | |
|---|---|---|---|---|
| 5,817,412 | A | * | 10/1998 | Lohmann ................. B32B 27/32 428/336 |
| 5,998,039 | A | * | 12/1999 | Tanizaki ................. C08L 23/12 428/34.9 |
| 6,686,055 | B2 | | 2/2004 | Tanaka et al. |
| 8,043,712 | B2 | | 10/2011 | Kawai et al. |
| 2002/0182426 | A1 | | 12/2002 | Tanaka et al. |
| 2003/0211298 | A1 | * | 11/2003 | Migliorini ................. B32B 27/18 428/195.1 |
| 2007/0292640 | A1 | | 12/2007 | Kawai et al. |
| 2008/0268221 | A1 | | 10/2008 | Inoue et al. |
| 2010/0260996 | A1 | * | 10/2010 | Chen ....................... B32B 27/32 428/220 |

FOREIGN PATENT DOCUMENTS

| | | |
|---|---|---|
| JP | 08-238730 A | 9/1996 |
| JP | 11-245355 A | 9/1999 |
| JP | 2002-210897 | 7/2002 |
| JP | 2003-170554 A | 6/2003 |
| JP | 2004-136566 A | 5/2004 |
| JP | 2004-167905 A | 6/2004 |
| JP | 2005-104151 A | 4/2005 |
| JP | 2005-305998 A | 11/2005 |
| JP | 2006-305884 A | 11/2006 |
| JP | 2006-327183 A | 12/2006 |
| JP | 2009-101606 A | 5/2009 |
| JP | 2009-172845 A | 8/2009 |
| WO | WO-2007/015415 A1 | 2/2007 |

OTHER PUBLICATIONS

Natta et al. "Structure and Properties of Isotactic Polypropylene". Il Nuovo Cimento, vol. 15, Issue 1, (1960); pp. 40-51.*
Office Action received in Japanese Patent Application No. 2012-542978 dated Jul. 29, 2014.
Office Action issued in Japanese Patent Application No. 2012-542978 dated Jan. 13, 2015.
Coleman, Bernard, D., et al., "General Theory of Stationary Random Sequences with Applications to the Tacticity of Polymers", Journal of Polymer Science, Part A. vol. 1, (1963), pp. 3183-3197.
International Search Report dated Feb. 21, 2012, PCT/JP2011/075984.

* cited by examiner

*Primary Examiner* — Prashant J Khatri
(74) *Attorney, Agent, or Firm* — Foley & Lardner LLP

(57) ABSTRACT

The polyolefin composite film is excellent in low-temperature heat sealability, heat-sealing strength and transparency, and at least has surface layer [i]//intermediate layer [iii]//core layer[i], wherein the surface layer[i]includes a propylene resin composition including 0-50 wt % of a specific propyleneα-olefin random copolymer (A) and/or a specific 1-buteneα-olefin copolymer (E), and 50-100 wt % of a propylene polymer (B) having a melting point of 120-170° C. ((A), (E) and (B) in the surface layer totals 100 wt %); the core layer [ii]includes a propylene resin composition including 70-100 wt % of a crystalline polypropylene (C) having a melting point of 150-170° C., and 0-30 wt % of the copolymer (A) ((C) and (A) in the core layer totals 100 wt %); and the intermediate layer[iii]includes a propylene resin composition including 50-95 wt % of the crystalline polypropylene (C) and 50-5 % of the polymer (B), the copolymer (A), andor the copolymer (E) ((C), (B), (A) and (E) in the intermediate layer totals 100 wt %).

9 Claims, No Drawings

POLYOLEFIN COMPOSITE FILM

TECHNICAL FIELD

The present invention relates to a polyolefin composite film, more particularly a polyolefin composite film excellent in low-temperature heat sealability, heat-sealing strength and transparency.

BACKGROUND ART

As a heat-sealable polyolefin composite film conventionally used for packaging and the like, a composite film formed by laminating a polyolefin resin having a low melting point on a crystalline polypropylene surface layer is known.

For example, the following methods have been specifically proposed. A polypropylene resin composition containing 1 to 50 wt % of a propylene polymer having a melting point of not lower than 150° C., 10 to 90 wt % of a propylene copolymer having a melting point of 100° C. or higher and lower than 150° C. and 1 to 80 wt % of a propylene or 1-butene copolymer having a melting point of 40° C. or higher and lower than 100° C. is laminated as a heat-fusible layer on one side of a biaxially-stretched polypropylene film, to thereby form a stretched film (Patent Literature 1: WO2007/015415). In another example, a coating layer composed of a propylene polymer composition containing a propylene/α-olefin random copolymer having a melting point of 120 to 140° C., a propylene/a-olefin random copolymer having a melting point of 80° C. or higher and lower than 120° C., and a butene-1/α-olefin random copolymer having a melting point of 40 to 100° C. is laminated on both sides of a biaxially-stretched film mainly composed of a propylene polymer, to thereby form a over-wrap packaging film (Patent Literature 2: JP-A-2003-170554). As described above, a composition containing two or more kinds of propylene copolymers differing in melting point is used as a surface layer (heat-sealable layer).

In addition to the two-layer film, a three-layer film has also been proposed. For example, an intermediate layer is provided between a base layer which is a biaxially-stretched polypropylene film and a surface layer composed of a composition containing two or more kinds of propylene copolymers differing in melting point, the intermediate layer being composed of a composition of a propylene homopolymer and a propylene/α-olefin copolymer, to thereby provide a heat-sealable laminated polypropylene resin film (Patent Literature 3: JP-A-2005-104151, Patent Literature 4: JP-A-2005-305998). In another example, a composition of propylene homopolymer and a propylene/α-olefin copolymer is used as a base layer; a composition of a propylene homopolymer and a propylene/α-olefin copolymer is used as an intermediate layer; and a propylene/α-olefin copolymer having a melting point of not higher than 150° C. or its composition is used as a surface layer (heat-fusible layer) (Patent Literature 5: JP-A-2006-305884, Patent Literature 6: JP-A-2006-327183).

However, the heat-sealable laminated polypropylene resin film using an intermediate layer specifically proposed in Patent Literature 3 or Patent Literature 4 is inferior in heat sealability.

CITATION LIST

Patent Literature

[Patent Literature 1] WO2007/015415
[Patent Literature 2] JP-A-2003-170554
[Patent Literature 3] JP-A-2005-104151
[Patent Literature 4] JP-A-2005-305998
[Patent Literature 5] JP-A-2006-305884
[Patent Literature 6] JP-A-2006-327183

SUMMARY OF THE INVENTION

Technical Problem

Such composite films as proposed in Patent Literatures 1 to 6, however, are insufficient in heat-sealing strength at a relatively low temperature range, and thus are limited in their applications as a packaging film.

The present invention provides a polyolefin composite film excellent in low-temperature heat sealability, heat-sealing strength and transparency.

Technical Solution

That is, a polyolefin composite film according to an aspect of the present invention has at least one surface layer [i], a core layer [ii], and an intermediate layer [iii] contacting directly with both the surface layer [i] and the core layer [ii], wherein the surface layer [i] is formed from a propylene resin composition that comprises:

a propylene/α-olefin random copolymer (A) that comprises 50 to 97 mol % of a unit derived from propylene and 3 to 50 mol % of a unit derived from C2-10 α-olefins excluding propylene, and/or a 1-butene/α-olefin copolymer (E) that comprises 50 to 95 mol % of a unit derived from 1-butene and 50 to 5 mol % of a unit derived from C2-10 α-olefins excluding 1-butene, the propylene/α-olefin random copolymer (A) and/or the 1-butene/α-olefin copolymer (E) being in an amount of 0 to 50 wt %, and a propylene polymer (B) that comprises 50 to 100 mol % of a unit derived from propylene and 0 to 50 mol % of a unit derived from C2-10 α-olefins excluding propylene and has a melting point of 120 to 170° C., the propylene polymer (B) being in an amount of 50 to 100 wt %, provided that the total amount of (A), (E) and (B) in the surface layer is 100 wt %;

wherein the core layer [ii] is formed from a propylene resin composition that comprises:

a crystalline polypropylene (C) that comprises 97 to 100 mol % of a unit derived from propylene and 0 to 3 mol % of C2-10 α-olefins excluding propylene and has a melting point of 150 to 170° C., the crystalline polypropylene (C) being in an amount of 70 to 100 wt %, and a propylene/α-olefin random copolymer (A) that comprises 50 to 97 mol % of a unit derived from propylene and 3 to 50 mol % of a unit derived from C2-10 α-olefins excluding propylene, the propylene/α-olefin random copolymer (A) being in an amount of 0 to 30 wt %, provided that the total amount of (C) and (A) in the core layer is 100 wt %; and wherein the intermediate layer [iii] is formed from a propylene resin composition that comprises:

a crystalline polypropylene (C) that comprises 97 to 100 mol % of a unit derived from propylene and 0 to 3 mol % of C2-10 α-olefins excluding propylene and has a melting point of 150 to 170° C., the crystalline polypropylene (C) being in an amount of 50 to 95 wt %, and a propylene polymer (B) that comprises 50 to 100 mol % of a unit derived from propylene and 0 to 50 mol % of a unit derived from C2-10 α-olefins excluding propylene and has a melting point of 120 to 170° C., a propylene/α-olefin random copolymer (A) that comprises 50 to 97 mol % of a unit derived from propylene and 3 to 50 mol % of a unit derived from C2-10 α-olefins excluding propylene, and/or a 1-butene/α-olefin random copolymer (E) that comprises 50 to 95 mol % of a unit derived from 1-butene and 50 to 5 mol % of a unit derived from α-olefins excluding 1-butene, the propylene polymer (B), the propylene/α-olefin random copolymer (A), and/or the 1-butene/α-olefin random copolymer (E) being in an amount of 50 to 5 wt %, provided that the total amount of (C), (B), (A) and (E) in the intermediate layer is 100 wt %.

A polyolefin composite film according to "another aspect" of the present invention has at least one surface layer [i], a core layer [ii], and an intermediate layer [iii] contacting directly with both the surface layer [i] and the core layer [ii], wherein the surface layer [i] is formed from a propylene resin composition that comprises:

a propylene/α-olefin random copolymer (A) that comprises 50 to 97 mol % of a unit derived from propylene and 3 to 50 mol % of a unit derived from C2-10 α-olefins excluding propylene, the propylene/α-olefin random copolymer (A) being in an amount of 15 to 100 wt %, and a propylene polymer (B) that comprises 50 to 100 mol % of a unit derived from propylene and 0 to 50 mol % of a unit derived from C2-10 α-olefins excluding propylene and has a melting point of 120 to 170° C., the propylene polymer (B) being in an amount of 0 to 85 wt %, provided that the total amount of (A) and (B) is 100 wt %;

wherein the core layer [ii] is formed from a propylene resin composition that comprises:

a crystalline polypropylene (C) that comprises 97 to 100 mol % of a unit derived from propylene and 0 to 3 mol % of C2-10 α-olefins excluding propylene and has a melting point of 150 to 170° C., the crystalline polypropylene (C) being in an amount of 70 to 100 wt %, and a propylene polymer (D) that comprises 50 mol % or more and less than 97 mol % of a unit derived from propylene, and more than 3 mol % and up to 50 mol % of a unit derived from C2-10 α-olefins excluding propylene, and has a melting point of lower than 140° C. or a melting point that is not observed as measured by Differential Scanning Calorimetry, the propylene polymer (D) being in an amount of 0 to 30 wt %, provided that the total amount of (C) and (D) is 100 wt %; and wherein the intermediate layer [iii] is formed from a propylene resin composition that comprises:

a crystalline polypropylene (C) that comprises 97 to 100 mol % of a unit derived from propylene and 0 to 3 mol % of C2-10 α-olefins excluding propylene, and has a melting point of 150 to 170° C., the crystalline polypropylene (C) being in an amount of 50 to 95 wt %, and a propylene polymer (D) that comprises 50 mol % or more and less than 97 mol % of a unit derived from propylene, and more than 3 mol % and up to 50 mol % of a unit derived from C2-10 α-olefins excluding propylene, and has a melting point of lower than 140° C. or a melting point that is not observed as measured by Differential Scanning Calorimetry, and/or a 1-butene/α-olefin random copolymer (E) that comprises 50 to 95 mol % of a unit derived from 1-butene and 50 to 5 mol % of a unit derived from α-olefins excluding 1-butene, the propylene polymer (D) and/or the 1-butene/α-olefin random copolymer (E) being in an amount of 50 to 5 wt %, provided that the total amount of (C), (D) and (E) is 100 wt %.

The polyolefin composite film according to "another aspect" in the present invention is described above.

In a preferable embodiment of the present invention, the propylene/α-olefin random copolymer (A) has a melting point of 110° C. or lower or has a melting point that is not observed. In a preferable embodiment of the present invention, the propylene polymer (B) has a melting point of 120 to 140° C., and the 1-butene/α-olefin copolymer (E) has a melting point of 60 to 110° C.

A polyolefin composite film according to a preferable embodiment of the present invention comprises a propylene/α-olefin random copolymer (A) which is a propylene/1-butene random copolymer that satisfies the following properties:

(1) the intrinsic viscosity as measured in decalin at 135° C. is 0.1 to 5 dl/g, (2) the molecular weight distribution (Mw/Mn) as determined by gel permeation chromatography is 1.5 to 3, and (3) the parameter B value, which shows a randomness of copolymerized monomer chain distribution, is 0.9 to 1.5.

In another preferable embodiment of the present invention, the polyolefin composite film is an unstretched film.

In another preferable embodiment of the present invention, the polyolefin composite film is a biaxially-stretched film.

In another preferable embodiment of the present invention, the percentage of the total thickness of the surface layer relative to the total thickness of the polyolefin composite film is 2 to 10%.

In another preferable embodiment of the present invention, the percentage of the total thickness of the intermediate layer relative to the total thickness of the polyolefin composite film is 2 to 10%.

In another preferable embodiment of the present invention, the polyolefin composite film has a five-layer structure consisting of surface layer/intermediate layer/core layer/intermediate layer/surface layer in this order.

In another preferable embodiment of the present invention, the total thickness of the polyolefin composite film is 10 to 35 micrometers (μm).

In another preferable embodiment of the present invention, the tensile modulus in the machine stretching direction or in the transverse stretching direction of the polyolefin composite film is 1.9 to 5.0 GPa.

ADVANTAGEOUS EFFECTS OF THE INVENTION

The polyolefin composite film of the present invention is excellent in low-temperature heat sealability, heat-sealing strength and transparency, and therefore is employable for a wide range of applications as packaging films for food, industrial materials and the like.

DESCRIPTION OF EMBODIMENTS

<Propylene/α-olefin random copolymer (A)>

The propylene/α-olefin random copolymer (A), constituting the surface layer [i] of the polyolefin composite film of the present invention, is a propylene/α-olefin random copolymer (A) that comprises:

a unit derived from propylene in an amount of 50 to 97 mol %, preferably 50 to 95 mol %, and a unit derived from C2-10 α-olefins excluding propylene in an amount of 3 to 50 mol %, preferably 5 to 50 mol %, provided that the total amount of the unit derived from propylene and the unit derived from α-olefins is 100 mol %. Regarding the α-olefins, one kind thereof or two or more kinds thereof may be used.

In a further preferable embodiment, the propylene/α-olefin random copolymer (A) according to the present invention comprises a unit derived from propylene in an amount of 60 mol % to 80 mol %, and a unit derived from C2-10 α-olefins, particularly a unit derived from α-olefins selected from ethylene and 1-butene, in an amount of 20 mol % to 40 mol %.

The propylene/α-olefin copolymer (A) according to the present invention preferably has a melting point of 140° C. or lower or a melting point that is not observed; more preferably a melting point of 110° C. or lower, or a melting point that is not observed.

The use of a propylene/α-olefin copolymer having a melting point of higher than 140° C. may result in a polyolefin composite film having inferior low-temperature heat sealability.

Regarding the propylene/α-olefin copolymer (A) according to the present invention, one kind of polymer may be used, or two or more kinds of polymers may be used, as needed.

Specific examples of the propylene/α-olefin copolymer (A) according to the present invention include propylene/ethylene copolymer, propylene/1-butene copolymer and propylene/ethylene/1-butene copolymer.

The propylene/α-olefin random copolymer (A) according to the present invention that is preferred is a propylene/1-butene random copolymer satisfying the following properties:

(1) the intrinsic viscosity [η] as measured in decalin at 135° C. is 0.1 to 5 dl/g;

(2) the molecular weight distribution (Mw/Mn) as determined by gel permeation chromatography is 1.5 to 3; and (3) the parameter B value, which shows a randomness of copolymerized monomer chain distribution, is 0.9 to 1.5, preferably 1.0 to 1.4.

The parameter B value, proposed by Coleman et al. (B. D. Coleman and T. G. Fox, J. Polym. Sci., Al, 3183(1963)), is defined as follows:

$$B = P_{12}/(2P_1 \cdot P_2),$$

wherein $P_1$ and $P_2$ are a first monomer content fraction and a second monomer content fraction, respectively; and $P_{12}$ is the proportion of (first monomer)-(second monomer) chains in all the dyad chains.

When the B value is 1, the copolymer obeys the Bernoulli statistics. When B<1, the copolymer is a block-like copolymer. When B>1, the copolymer is an alternating-like copolymer. When B=2, the copolymer is an alternating copolymer.

The MFR (melt flow rate; ASTM D-1238, load: 2160 g, temperature: 230° C.) of the propylene/α-olefin random copolymer (A) according to the present invention is not particularly limited as long as a film can be formed, but is usually 0.5 to 20 g/10 min, preferably 2 to 10 g/10 min.

<1-butene/α-olefin copolymer (E)>

The 1-butene/α-olefin copolymer (E), constituting the surface layer [i] and the intermediate layer [iii] of the polyolefin composite film of the present invention, is a 1-butene/α-olefin random copolymer (E) that comprises:

a unit derived from 1-butene in an amount of 50 to 95 mol %, preferably 60 to 95 mol %, particularly preferably 70 to 95 mol %, and a unit derived from α-olefins excluding 1-butene in an amount of 50 to 5 mol %, preferably 40 to 5 mol %, particularly preferably 30 to 5 mol %, provided that the total amount of the unit derived from 1-butene and the unit derived from α-olefins is 100 mol %. Regarding the α-olefins, one kind thereof may be used, or two or more kinds thereof may be used, as needed.

The 1-butene/α-olefin random copolymer (E) according to the present invention preferably has a melting point of 60 to 110° C.

The use of a 1-butene/α-olefin copolymer having a melting point of higher than 110° C. may result in a polyolefin composite film having inferior low-temperature heat sealability. On the other hand, the use of a 1-butene/α-olefin copolymer having a melting point of lower than 60° C. may result in a polyolefin composite film having sticky surface.

Regarding the 1-butene/α-olefin random copolymer (E) according to the present invention, one kind of polymer may be used, or two or more kinds of polymers may be used, as needed.

Specific examples of the 1-butene/α-olefin random copolymer (E) according to the present invention include 1-butene/ethylene copolymer, 1-butene/propylene copolymer and 1-butene/ethylene/propylene copolymer.

The 1-butene/α-olefin random copolymer (E) according to the present invention that is preferred is a 1-butene/α-olefin copolymer satisfying the following properties:

(1") the intrinsic viscosity [η] as measured in decalin at 135° C. is 0.1 to 5 dl/g;

(2") the molecular weight distribution (Mw/Mn) as determined by gel permeation chromatography is 2 to 6; and (3") the parameter B value, which shows a randomness of copolymerized monomer chain distribution, is 0.9 to 1.5, preferably 0.9 to 1.4.

The MFR (melt flow rate; ASTM D-1238, load: 2160 g, temperature: 230° C.) of the 1-butene/α-olefin random copolymer (E) according to the present invention is not particularly limited as long as a film can be formed, but is usually 1 to 20 g/10 min, preferably 5 to 15 g/10 min.

<Propylene polymer (B)>

The propylene polymer (B), constituting the surface layer [i] and the intermediate layer [iii] of the polyolefin composite film of the present invention, is a propylene polymer (B) that comprises:

a unit derived from propylene in an amount of 50 to 100 mol %, preferably 85 to 97 mol %, and a unit derived from C2-10 α-olefins excluding propylene in an amount of 0 to 50 mol %, preferably 3 to 15 mol %, and has a melting point of 120 to 170° C., preferably 120 to 140° C., provided that the total amount of the unit derived from propylene and the unit derived from α-olefins is 100 mol %. Regarding the α-olefins, one kind thereof may be used, or two or more kinds thereof may be used, as needed.

Regarding the propylene polymer (B) according to the present invention, one kind of polymer may be used, or two or more kinds of polymers may be used, as needed.

The use of a propylene copolymer having a melting point of lower than 120° C. may result in a polyolefin composite film having insufficient balance between low-temperature heat sealability and sealing strength.

Specific examples of the propylene polymer (B) according to the present invention include block copolymers and random copolymers including propylene/ethylene copolymer, propylene/ethylene/1-butene copolymer and propylene/1-butene copolymer.

The MFR (melt flow rate; ASTM D-1238, load: 2160 g, temperature: 230° C.) of the propylene polymer (B) according to the present invention is not particularly limited as long as a film can be formed, but is usually 0.5 to 20 g/10 min, preferably 2 to 10 g/10 min.

<Crystalline polypropylene (C)>

The crystalline polypropylene (C), constituting the core layer [ii] and the intermediate layer [iii] of the polyolefin composite film of the present invention, is a crystalline polypropylene (C) that comprises:

a unit derived from propylene in an amount of 97 to 100 mol %, preferably 98 to 100 mol %, and at least one unit derived from C2-10 α-olefins excluding propylene in an amount of 0 to 3 mol %, preferably 0 to 2 mol %, and has a melting point of 150 to 170° C., preferably 155 to 165° C., provided that the total amount of the unit derived from propylene and the unit derived from α-olefins is 100 mol %.

When the crystalline polypropylene (C) contains the unit derived from α-olefins, one kind thereof may be used, or two or more kinds thereof may be used, as needed.

The use of a polypropylene having a melting point of lower than 150° C. in the core layer [ii] tends to result in a polyolefin composite film having insufficient rigidity and heat resistance.

Regarding the crystalline polypropylene (C) according to the present invention, one kind of polymer may be used, or two or more kinds of polymers may be used, as needed.

Specific examples of the crystalline polypropylene (C) according to the present invention include propylene homopolymer, propylene/ethylene copolymer and copolymers of propylene and an α-olefin such as propylene/1-butene copolymer and propylene/ethylene/1-butene copolymer; propylene homopolymer is preferred.

The MFR (melt flow rate; ASTM D-1238, load: 2160 g, temperature: 230° C.) of the crystalline polypropylene (C) according to the present invention is not particularly limited as long as a film can be formed, but is usually 0.5 to 20 g/10 min, preferably 2 to 10 g/10 min.

<Propylene polymer (D)>

In one aspect of the present invention, the propylene/α-olefin random copolymer (A) constituting the core layer [ii] and the intermediate layer [iii] of the polyolefin composite film may be the propylene polymer (D).

The propylene polymer (D) is a polymer that comprises:

a unit derived from propylene in an amount of 50 mol % to less than 97 mol %, preferably 60 mol % to less than 80 mol %, and at least one unit derived from C2-10 α-olefins excluding propylene in an amount of more than 3 mol % and up to 50 mol %, preferably more than 20 mol % and up to 40 mol %, and has a melting point of lower than 140° C. or a melting point that is not observed as measured by Differential Scanning Calorimetry, preferably 110° C. or lower or a melting point that is not observed.

Regarding the α-olefins, one kind thereof may be used, or two or more kinds thereof may be used, as needed.

Among the propylene polymers (D), a preferred propylene polymer (D) satisfies the following properties:

(1') the intrinsic viscosity [η] as measured in decalin at 135° C. is 0.1 to 5 dl/g;

(2') the molecular weight distribution (Mw/Mn) as determined by gel permeation chromatography is 1.5 to 4; and (3') the parameter B value, which shows a randomness of copolymerized monomer chain distribution, is 0.7 to 1.5.

Regarding the propylene polymer (D) according to the present invention, one kind of polymer may be used, or two or more kinds of polymers may be used, as needed.

The use of a propylene polymer having a melting point of 140° C. or higher may result in a polyolefin composite film having inferior low-temperature heat sealability and/or heat-sealing strength.

Specific examples of the propylene polymer (D) according to the present invention are block copolymers and random copolymers including propylene/ethylene copolymer, propylene/1-butene copolymer and propylene/ethylene/1-butene copolymer.

The MFR (melt flow rate; ASTM D-1238, load: 2160 g, temperature: 230° C.) of the propylene polymer (D) according to the present invention is not particularly limited as long as a film can be formed, but is usually 0.5 to 20 g/10 min, preferably 2 to 10 g/10 min.

<Polyolefin composite film> The polyolefin composite film of the present invention is a polyolefin composite film that has at least one surface layer [i], a core layer [ii] and an intermediate layer [iii] contacting directly with both the surface layer [i] and the core layer [ii].

In the case where the composite film of the present invention has a three-layer structure consisting of the surface layer, the core layer and the intermediate layer, the term "core layer" simply refers to a layer serving as a core material, not necessarily meaning a layer that constitutes the center located between the surface layer and the intermediate layer.

<Surface layer [i]>

The surface layer [i] of the polyolefin composite film of the present invention is formed from an olefin polymer composition (X) comprising the propylene/α-olefin random copolymer (A), and/or the 1-butene/α-olefin copolymer (E) in an amount of 0 to 50 wt %, preferably 0 to 30 wt %, more preferably 3 to 30 wt %; and the propylene polymer (B) in an amount of 50 to 100 wt %, preferably 70 to 100 wt %, more preferably 70 to 97 wt %, provided that the total amount of (A), (E) and (B) in the surface layer is 100 wt %.

It is within the scope of the present invention that the surface layer [i] does not contain the propylene/α-olefin random copolymer (A) and/or the 1-butene/α-olefin copolymer (E). However, in a particularly suitable embodiment, the propylene/α-olefin random copolymer (A) and/or the 1-butene/α-olefin copolymer (E) are included, preferably in an amount of 3 to 30 wt %.

The embodiment containing the propylene/α-olefin random copolymer (A) and/or the 1-butene/α-olefin copolymer (E) is superior in low-temperature heat sealability compared with embodiments not containing these components.

<Core layer [ii]>

The core layer [ii] of the polyolefin composite film of the present invention is formed from a propylene polymer composition (Y) comprising 70 to 100 wt % of the crystalline polypropylene (C) and 0 to 30 wt % of the propylene/α-olefin copolymer (A), provided that the total amount of (A) and (C) is 100 wt %.

The use of the crystalline polypropylene (C) alone as a polymer component of the core layer [ii] leads to further improvement of increase in the heat-sealing strength, as compared with when the propylene/α-olefin copolymer (A) and the crystalline polypropylene (C) are used in combination.

The use of a composition in which the amount of the propylene/α-olefin copolymer (A) exceeds 30 wt % may result in a polyolefin composite film having inferior heat resistance and rigidity.

<Intermediate layer [iii]>

The intermediate layer [iii] in the polyolefin composite film of the present invention is formed from a propylene composition that comprises the crystalline polypropylene (C) in an amount of 50 to 95 wt %, preferably 70 to 95 wt %; and in addition thereto, the propylene polymer (B), the propylene/α-olefin random copolymer (A) and/or the 1-butene/α-olefin random copolymer (E), in an amount of 50 to 5 wt %, preferably 30 to 5 wt %, provided that the total amount of (C), (B), (A) and (E) in the intermediate layer is 100 wt %.

In the intermediate layer [iii], "and/or" is a term to indicate that all of the following embodiments are within the scope of the present invention: the embodiment using one component selected from the propylene polymer (B), the propylene/α-olefin random copolymer (A) and the 1-butene/α-olefin random copolymer (E); the embodiment using two components in combination selected therefrom; and the embodiment using all the three components selected therefrom.

The use of a composition in which the amount of the crystalline polypropylene (C) is less than 50 wt % for the intermediate layer [iii] of the present invention may result in a polyolefin composite film having inferior heat-sealing strength. On the other hand, the use of a composition in which the amount of the crystalline polypropylene (C) exceeds 95 wt % may result in a polyolefin composite film having inferior heat-sealing strength.

The polyolefin composite film according to "another aspect" of the present invention is described below.

That is, in the surface layer [i], the propylene/α-olefin random copolymer (A) is used in an amount of 15 to 100 wt % and the propylene polymer (B) is used in an amount of 85 to 0 wt %; preferably, the propylene/α-olefin random copolymer (A) is used in an amount of 30 to 100 wt % and the propylene polymer (B) is used in an amount of 70 to 0 wt %; more preferably, the propylene/α-olefin random copolymer (A) is used in an amount of 50 to 100 wt % and the propylene polymer (B) is used in an amount of 50 to 0 wt % (in each case, the total amount of (A) and (B) is 100 wt %).

With the configuration described above, a polyolefin composite film which is excellent in heat-sealing strength at a relatively low temperature can be obtained.

In the present invention, the core layer [ii] comprises 70 to 100 wt % of the crystalline polypropylene (C) and 0 to 30 wt % of the propylene polymer (D).

The core layer [ii] may contain recycled materials of the core layer [ii], recycled materials of polymers that constitute the surface layer [i] and the intermediate layer [iii] and the like, as long as the range mentioned above is satisfied.

The core layer [ii] comprises the crystalline polypropylene (C) in an amount of 70 to 100 wt %, preferably 80 to 100 wt %, particularly preferably 85 to 100 wt %, and propylene polymer (D) in an amount of 0 to 30 wt %, preferably 0 to 20 wt %, particularly preferably 0 to 15 wt % (in each case, the total amount of (C) and (D) is 100 wt %).

In the present invention, the intermediate layer [iii] comprises, together with 50 to 95 wt % of the crystalline polypropylene (C), 50 to 5 wt % of a composition (Z') containing the propylene polymer (D) and/or the 1-butene/α-olefin random copolymer (E), provided that the total amount of (C) and the composition (Z') containing (D) and/or (E) is 100 wt %.

The crystalline polypropylene (C) used for the intermediate layer [iii], as long as being used in the range defined above, may differ from or may be the same as the crystalline polypropylene (C) used for the core layer [ii].

The propylene polymer (D) that may be used for the intermediate layer [iii], as long as being used in the range or in the preferred range defined above, may differ from or may be the same as the propylene polymer (D) used for the core layer [ii].

Similarly, examples of the 1-butene/α-olefin copolymer (E) that may be used for the intermediate layer [iii] include 1-butene/ethylene copolymer, 1-butene/propylene copolymer and 1-butene/ethylene/propylene copolymer. Regarding these polymers, one kind of polymer may be used, or two or more kinds of polymers may be used, as needed.

In the present invention, embodiments of the intermediate layer [iii] include the embodiment where the layer (iii) consists of the component (C) and the component (D); the embodiment where the layer (iii) consists of the component (C) and the component (E); and the embodiment where the layer (iii) consists of the component (C), the component (D) and the component (E). In these embodiments, the layer (iii) contains (A) in an amount of 50 to 95 wt %, and (D) and/or (E) in an amount of 50 to 5 wt %, more preferably (A) in an amount of 60 to 90 wt %, (D) and/or (E) in an amount of 40 to 10 wt %, provided that the total of (A), and (D) and/or (E) is 100 wt %.

It is desirable that each polymer constituting the intermediate layer contains the polymer defined as the surface layer in the range defined above. Each polymer constituting the intermediate layer, although not required to necessarily contain the same polymer as used for the surface layer, may contain the same polymer as used for the surface layer in view of economy and other factors.

The above description focuses on the polyolefin composite film according to another aspect of the present invention.

The propylene/α-olefin random copolymer (A), the 1-butene/α-olefin copolymer (E), the propylene polymer (B), the crystalline polypropylene (C), the propylene polymer (D), and the olefin polymer compositions (X) and (X'), the propylene polymer composition (Y), the olefin polymer compositions (Z) and (Z'), each of which forms the polyolefin composite film of the present invention, may optionally contain antioxidants, antifogging agents, antistatic agents such as nonionic antistatic agents and polymer antistatic agents, antiblocking agents, lubricants, nucleating agents and the like.

The polyolefin composite film of the present invention is formed from the surface layer [i], the core layer [ii] and the intermediate layer [iii], wherein the intermediate layer [iii] is configured to directly contract with both the surface layer [i] and the core layer [ii]. Specific examples of the polyolefin composite film of the present invention include a three-layer film consisting of [i]//[iii]//[ii] and a five-layer film consisting of [i]//[iii]//[ii]//[iii]//[i], and are not limited thereto as long as the polyolefin composite film has [i]//[iii]//[ii] structure.

In the five-layer film consisting of [i]//[iii]//[ii]//[iii]//[i], for example, the surface layers [i] provided on both the sides are not required to be necessarily the same in thickness, but are desirably substantially the same in thickness. Likewise, the intermediate layers [iii] provided both the sides are not required to be necessarily the same in thickness, but are desirably substantially the same in thickness.

The thickness of each layer of the polyolefin composite film of the present invention can be appropriately determined according to use. The thickness of the surface layer [i] is usually 0.5 to 10 μm, preferably 1 to 5 μm; the thickness of the core layer [ii] is usually 8 to 60 μm, preferably 10 to 50 μm, more preferably 15 to 45 μm; and the thickness of the intermediate layer [iii] is usually 0.5 to 10 μm, preferably 1 to 5 μm. As such, the whole thickness of the polyolefin composite film is usually 9 to 100 μm, preferably 10 to 35 μm.

If the thickness of the intermediate layer is less than 0.5 μm, sufficient heat-sealing strength may not be obtained, depending on use.

In a preferred polyolefin composite film of the present invention, the surface layer [i] has a thickness of 1 to 20%, preferably 2 to 10%, more preferably 3 to 8% of the thickness of the core layer [ii]; and the intermediate layer [iii] has a thickness of 1 to 20%, preferably 2 to 10%, more preferably 3 to 8% of the thickness of the core layer [ii]. When a plurality of surface layers [i] and intermediate layers [iii] are provided, the thickness requirements defined above apply to each individual layer.

The polyolefin composite film of the present invention is excellent both in strength and in heat-sealing strength.

The polyolefin composite film of the present invention may be an unstretched film, or a monoaxially-stretched film or a biaxially-stretched film.

The polyolefin composite film of the present invention may have another base material laminated thereon according to use. The base material is formed from a thermoplastic resin film, an aluminum foil, paper or the like, the thermoplastic resin film including films composed of polyesters typified by polyethylene terephthalate and polyethylene naphthalate; polycarbonate films; films composed of polyamides such as nylon 6 and nylon 66; and films composed of polyolefins such as ethylene/vinyl alcohol copolymer films, polyvinyl alcohol films, polyvinyl chloride films, polyvinylidene chloride films and polypropylene. The base material formed from such a thermoplastic resin film may be an unstretched film, or may be a monoaxially or biaxially stretched film. The base material may be of one layer, or of two or more layers. The thermoplastic resin films may be films obtained by depositing inorganic substances such as aluminum, zinc and silica or oxides thereof.

The polyolefin composite film of the present invention may be produced by a known method. An exemplary method is co-extrusion molding by T-die method or inflation method that uses extruders of the number of which corresponds to the number of types of the resin composition of layers to be laminated, to thereby produce a composite film. After co-extrusion, the film may be stretched in at least one direction to form a stretched film. Examples of the stretching method include monoaxial stretch molding, successive biaxial stretching and simultaneous biaxial stretching. In biaxial stretching, the stretch ratio is usually about 3 to 12 times in machine direction, and usually about 3 to 12 times in transverse direction.

The polyolefin composite film of the present invention, when being a biaxially-stretched film, exhibits excellent low-temperature heat sealability performance while maintaining the strength of the polyolefin composite film. For example, the biaxially-stretched polyolefin composite film of the present invention exhibits excellent strength and excellent low-temperature heat sealability, not only when having a tensile modulus (MD, TD) of less than 3GPa but also when having a tensile modulus (MD, TD) of not less than 3GPa.

Thus, the polyolefin composite film of the present invention desirably has a tensile modulus of 1.9 to 5.0 GPa, more desirably 1.9 to 4.5 GPa, in the machine direction (MD) or in the transverse direction (TD) of stretching. Still more desirably, the polyolefin composite film of the present invention has a tensile modulus falling within the above-mentioned range, both in the machine direction (MD) and in the transverse direction (TD) of stretching.

When the composite films according to the present invention are superposed on each other in such a manner that their surface layers are superposed on each other and are heat-sealed in a method described later, it is preferable that the heat-sealing strength based on 180° peeling strength (temperature at the upper heat seal bar: 140° C.) is 7.5 N/15 mm or more, more preferably 7.5 N/15 mm to 75 N/15 mm, particularly preferably 9 N/15 mm to 75 N/15 mm.

As required, the polyolefin composite film of the present invention is surface-treated by e.g., corona treatment, plasma treatment, flame treatment or and like, in a range that is not detrimental to the object of the present invention.

EXAMPLES

Hereinafter, the present invention is described with greater detail with reference to Examples, but the present invention is not limited to these Examples.

Properties indicated in the Examples were measured by the following methods.

[Heat-sealing strength]

Polyolefin composite films to be measured were superposed on each other in such a manner that their surface layers were superposed on each other. Both sides of the composite films superposed were sandwiched by a fluororesin sheet having a thickness of 50 μm (sheet composed of a fluororesin (manufactured by DuPont, product name: Teflon™, to prepare a test piece. Subsequently, heat seal bars of a heat seal tester (TB-701B manufactured by TESTER SANGYO CO., LTD.) were set so as to be 5 mm in width×300 mm in length, and the lower seal bar was set at 70° C., and the temperature of the upper seal bar was varied. Then, the test piece (fluororesin sheet/composite film/composite film/fluororesin sheet), which was held by the heat seal bars, was heat-sealed at a pressure of 0.2 MPa for 1.0 sec. After the fluororesin sheet was detached, the heat-sealed part of the composite films was allowed to stand under a room temperature of about 23° C. for 2 days. The composite films including their heat-sealed parts were slit, the slit part measuring 15 mm in width, while their non-sealed parts were chucked to a tensile tester ("IM-20ST" manufactured by "INTESCO"). Then, at a rate of 300 mm/min, the 180° peeling strength between the composite films was measured. The above operation was performed five times, and an average value thereof was defined as a heat-sealing strength.

[Melting point]

A press sheet having a thickness of 3 mm was prepared by preheating for 5 min and then pressurizing for 2 min with a hydraulic heat-pressing molding machine set at 190° C., and immediately thereafter cooling for 4 min with a cooling tank set at 20° C. This sheet was kept at 23° C.±2° C. for 10 days prior to testing. Then, the press sheet was cooled to −40° C.

with a differential scanning calorimeter (DSC) and then heated to 200° C. at a heating rate of 10° C./min, to determine an exothermic and endothermic curve. A temperature at the maximum endothermic peak was defined as a melting point.

[Heat-sealing initiation temperature]

The heat-sealing initiation temperature was defined as a temperature (°C.) of the upper seal bar at which the heat-sealing strength as measured by the above method was 2 N/15 mm.

[Tensile modulus]

By the method in accordance with JIS K7127, the tensile modulus of the film was measured five times in its machine direction (MD) and in its transverse direction (TD), and an average value thereof was defined as modulus.

The following polymers were used for Examples and Comparative Examples.

(1) Propylene/α-olefin random copolymer (A)
(1-1) PBR
A propylene/1-butene random copolymer (PBR) (propylene content: 75 mol %, 1-butene content: 25 mol %, melting point: 77° C., MFR (230° C.): 7 g/10 min, intrinsic viscosity [η]: 1.8 dl/g, Mw/Mn: 2.0, B value: 1.0) was used.
(1-2) PER
A propylene/ethylene random copolymer (PER) (propylene content: 69 mol %, ethylene content: 31 mol %, melting point: 96° C., MFR (230° C.): 8g/10 min, intrinsic viscosity [η]: 1.7 dl/g, Mw/Mn: 2.7, B value: 0.7) was used.
(1-3) PBER (this is also the propylene polymer (D))
A propylene/1-butene/ethylene random copolymer (PBER) (1-butene content: 20 mol %, ethylene content: 14 mol %, melting point: not observed, intrinsic viscosity [η]: 1.8 dl/g, MFR (230° C.): 7 g/10 min, Mw/Mn: 2.0, B value: 1.0) was used.
(2) Propylene polymer (B)
(2-1) r-PP
A propylene/ethylene/1-butene random copolymer (r-PP) (ethylene content: 2.2 mol %, 1-butene content: 1.5 mol %, melting point: 138° C., MFR (230° C.): 7 g/10 min) was used.
(2-2) Ter-PP
A propylene/ethylene/1-butene random copolymer (Ter-PP) (ethylene content: 9.5 mol %, 1-butene content: 3.9 mol %, melting point: 131° C., MFR (230° C.): 6 g/10 min) was used.

(3) Crystalline polypropylene (C)
(3-1) h-PP
A propylene homopolymer (h-PP) (melting point: 160° C., MFR (230° C.): 3 g/10 min) was used.
(4) 1-butene/α-olefin copolymer (E)
(4-1) BER
A 1-butene/ethylene random copolymer (BER) (1-butene content: 95 mol %, ethylene content: 5 mol %, melting point: 100° C., MFR (230° C.): 9 g/10 min, intrinsic viscosity [η]: 1.8 dl/g, Mw/Mn: 3.4, B value: 1.0) was used.
(4-2) BPR
A 1-butene/propylene random copolymer (BPR) (1-butene content: 75 mol %, propylene content: 25 mol %, melting point: 77° C., MFR (230° C):9 g/10 min, intrinsic viscosity [η]: 1.7 dl/g, Mw/Mn: 4.9, B value: 0.9) was used.

Examples 1 to 11 and Comparative Examples 1 to 3

[Molding of polyolefin composite film]

As shown in Table 1, each polymer mentioned above was used to form a three-kind five-layer composite film having surface layers, a core layer and intermediate layers (surface layer//intermediate layer//core layer//intermediate layer//surface layer) in a manner as described below.

Three extruders equipped with a T-die were used to produce a three-kind five-layer configuration. Polymers were fed to respective extruders at proportions that are shown in Table 1 for the surface layer, the core layer and the intermediate layer. The temperatures of the die and of the resin were set at 230° C., and the extrusion amounts from the respective extruders were set so as to achieve that the thickness proportion of surface layer//intermediate layer//core layer//intermediate layer//surface layer would become 1/1/21/1/1. Then, co-extrusion molding was performed to obtain an unstretched film having a thickness of 1000 μm.

The unstretched film was stretched with the use of a batch-type biaxial-stretching machine at a stretching temperature of 158° C. at a stretching ratio of 5 times in machine direction and 8 times in transverse direction, to obtain a biaxially-stretched polyolefin composite film.

Regarding this polyolefin composite film, "heat-sealing strength" and "heat-sealing initiation temperature" were measured. Results thereof are shown in Table 1.

TABLE 1

| | | Example 1 | Example 2 | Example 3 | Example 4 | Example 5 | Example 6 | Example 7 | Example 8 | Example 9 | Example 10 | Example 11 | Comp. Example 1 | Comp. Example 2 | Comp. Example 3 |
|---|---|---|---|---|---|---|---|---|---|---|---|---|---|---|---|
| Surface layer (wt %) | r-PP | 85 | 85 | 85 | 85 | 85 | 85 | | | | | | 85 | 85 | 70 |
| | Ter-PP | | | | | | | 85 | 85 | 85 | 100 | | | | 30 |
| | PBR | 15 | 15 | 15 | | | 15 | 15 | 15 | | | | 15 | 15 | |
| | BER | | | | 15 | | | | | 15 | | | | | |
| | BPR | | | | | 15 | | | | | | | | | |
| | PER | | | | | | | | | | | | | | 30 |
| Intermediate layer (wt %) | h-PP | 85 | 50 | 70 | 85 | 85 | 90 | 50 | 85 | 85 | 85 | 85 | 100 | 70 | 85 |
| | r-PP | | 50 | | | | | | | | | | | | |
| | Ter-PP | | | | | | | 50 | | | | | | | |
| | PBR | 15 | | | | | | | 15 | | 15 | 15 | | | 15 |
| | BPR | | | | | 15 | | | | | | | | | |
| | PER | | | 30 | | | | | | | | | | 30 | |
| | BER | | | | 15 | | | | | 15 | | | | | |
| | PBER | | | | | | 10 | | | | | | | | |
| Core layer (wt %) | h-PP | 100 | 100 | 100 | 100 | 100 | 100 | 100 | 100 | 100 | 100 | 85 | 100 | 100 | 100 |
| | PBR | | | | | | | | | | | 15 | | | |

TABLE 1-continued

| | | Example 1 | Example 2 | Example 3 | Example 4 | Example 5 | Example 6 | Example 7 | Example 8 | Example 9 | Example 10 | Example 11 | Comp. Example 1 | Comp. Example 2 | Comp. Example 3 |
|---|---|---|---|---|---|---|---|---|---|---|---|---|---|---|---|
| Heat-sealing strength (N/15 mm) | 70° C. | | | | | | | 0 | 0 | 0 | | | | | |
| | 80° C. | 0 | 0 | | | | | 0.29 | 0.45 | 0.4 | | 0 | 0 | | |
| | 90° C. | 0.33 | 0.21 | | 0 | 0 | | 2.48 | 2.31 | 2.15 | | 0.5 | 0.4 | | |
| | 100° C. | 0.84 | 0.38 | 0.42 | 0.18 | 0.2 | 0.2 | 5.67 | 5.58 | 5.48 | 0 | 0.8 | 0.8 | 0 | 0 |
| | 110° C. | 1.78 | 1.63 | 1.66 | 0.78 | 0.8 | 1.67 | 7.84 | 8.86 | 6.31 | 0.12 | 1.78 | 1.81 | 0 | 0.1 |
| | 120° C. | 5.18 | 5.54 | 5.67 | 2.21 | 2.15 | 5.5 | 8.16 | 10.2 | 6.27 | 3.15 | 5.18 | 4.31 | 0 | 0.3 |
| | 130° C. | 9.04 | 7.86 | 8.03 | 7.62 | 7.77 | 8.03 | 8.67 | 10.4 | 6.77 | 8.86 | 9.04 | 4.28 | 0.8 | 1.2 |
| | 140° C. | 9.53 | 7.84 | 8.04 | 7.64 | 7.82 | 8.04 | 8.51 | 10.5 | 7.74 | 10.5 | 9.53 | 4.34 | 8.0 | 9.0 |
| | 150° C. | | | | | | | | | | | | | | |
| Heat-sealing initiation temperature [HSIT] | [° C.] | 111 | 111 | 111 | 120 | 120 | 111 | 88 | 88 | 89 | 118 | 111 | 111 | 132 | 131 |
| Tensile modulus (MD) | [GPa] | 2.3 | 2.2 | 2.0 | 2.3 | 2.3 | 2.1 | 2.0 | 2.3 | 2.4 | 2.3 | 1.9 | 2.8 | 1.7 | 2.7 |
| Tensile modulus (TD) | [GPa] | 3.5 | 3.4 | 3.1 | 3.4 | 3.5 | 3.3 | 3.0 | 3.5 | 3.6 | 3.6 | 2.8 | 4.2 | 2.8 | 4.0 |

The polyolefin composite film of the present invention has high heat-sealing strength.

INDUSTRIAL APPLICABILITY

The polyolefin composite film of the present invention provides excellent performance of a heat-sealing strength of 7.5 N/15 mm or more at a temperature of 140° C., as well as excellent transparency, and therefore is widely employable for various packaging materials for food, industrial materials and the like.

The invention claimed is:
1. A polyolefin composite film having a five-layer structure consisting of surface layer [i]/intermediate layer [iii]/core layer [ii]/intermediate layer [iii]/surface layer [i] in this order,
wherein the surface layer [i] is formed from a propylene resin composition that comprises:
a propylene/1-butene copolymer (A) in an amount of 0 to 50 wt %, and
a propylene/ethylene/1-butene copolymer (B) in an amount of 50 to 100 wt %,
provided that the total amount of (A) and (B) in the surface layer is 100 wt %;
wherein the core layer [ii] is formed from a propylene resin composition that comprises:
a crystalline polypropylene (C) in an amount of 70 to 100 wt %, and
the propylene/1-butene copolymer (A) in an amount of 0 to 30 wt %,
provided that the total amount of (C) and (A) in the core layer is 100 wt %; and
wherein the intermediate layer [iii] is formed from a propylene resin composition that comprises:
the crystalline polypropylene (C) in an amount of 50 to 95 wt % and
the propylene/1-butene copolymer (A) in an amount of 50 to 5 wt %,
provided that the total amount of (C) and (A) in the intermediate layer is 100 wt %,
wherein the propylene/1-butene copolymer (A) comprises 60 to 80 mol % of a unit derived from propylene and 20 to 40 mol % of a unit derived from 1-butene, has a melting point of 140° C. or lower or a melting that is not observed, and satisfies the following properties:
(1) the intrinsic viscosity as measured in decalin at 135° C. is 0.1 to 5 dl/g,
(2) the molecular weight distribution (Mw/Mn) as determined by gel permeation chromatography is 1.5 to 3, and
(3) the parameter B value, which shows a randomness of copolymerized monomer chain distribution, is 0.9 to 1.5,
the propylene/ethylene/1-butene copolymer (B) comprises 85 to 97 mol % of a unit derived from propylene and 3 to 15 mol % of a unit derived from ethylene and 1-butene and has a melting point of 120 to 170° C.,
the crystalline polypropylene (C) comprises 98 to 100 mol % of a unit derived from propylene and 0 to 2 mol % of C2-10 α-olefin excluding propylene and has a melting point of 150 to 170° C.

2. The polyolefin composite film according to claim 1, wherein the propylene/1-butene copolymer (A) has a melting point of 110° C. or lower or has a melting point that is not observed.

3. The polyolefin composite film according to claim 1, wherein the propylene/ethylene/1-butene copolymer (B) has a melting point of 120 to 140° C.

4. The polyolefin composite film according to claim 1, wherein the polyolefin composite film is an unstretched film.

5. The polyolefin composite film according to claim 1, wherein the polyolefin composite film is a biaxially-stretched film.

6. The polyolefin composite film according to claim 1, wherein the thickness percentage of each surface layer relative to the total thickness of the polyolefin composite film is 2 to 10%.

7. The polyolefin composite film according to claim 1, wherein the thickness percentage of each intermediate layer relative to the total thickness of the polyolefin composite film is 2 to 10%.

8. The polyolefin composite film according to claim 1, wherein the total thickness of the polyolefin composite film is 10 to 35 micrometers (μm).

9. The polyolefin composite film according to claim 1, wherein the tensile modulus in the machine stretching direction or in the transverse stretching direction of the polyolefin composite film is 1.9 to 5.0 GPa.

* * * * *